Sept. 16, 1947.　　　D. BIERMANN　　　2,427,586
VARIABLE PITCH PROPELLER
Filed Feb. 7, 1944　　　3 Sheets-Sheet 1

INVENTOR.
DAVID BIERMANN
BY Bruno C. Lechler
ATTORNEY

Sept. 16, 1947.    D. BIERMANN    2,427,586
VARIABLE PITCH PROPELLER
Filed Feb. 7, 1944    3 Sheets-Sheet 2

INVENTOR.
DAVID BIERMANN
BY
Bruno C. Lechler
ATTORNEY

Sept. 16, 1947.  D. BIERMANN  2,427,586
VARIABLE PITCH PROPELLER
Filed Feb. 7, 1944  3 Sheets-Sheet 3
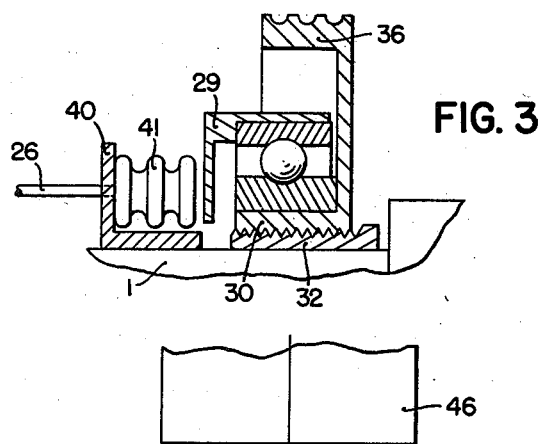
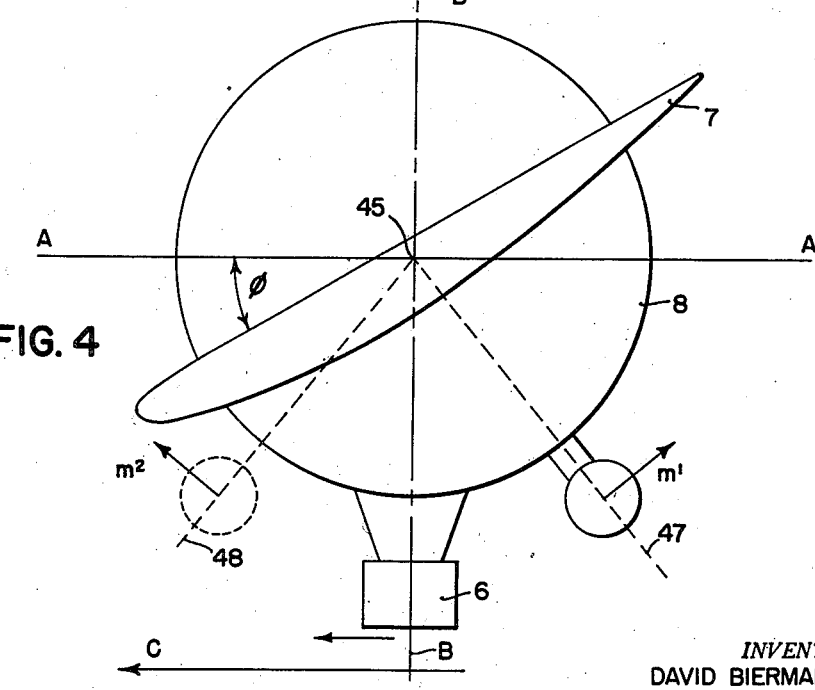
INVENTOR.
DAVID BIERMANN
BY
Bruno C. Lechler
ATTORNEY Patented Sept. 16, 1947

2,427,586

UNITED STATES PATENT OFFICE 2,427,586

VARIABLE PITCH PROPELLER

David Biermann, Blue Island, Ill., assignor to Wickwire Spencer Aviation Corporation, New York, N. Y., a corporation of Delaware Application February 7, 1944, Serial No. 521,345

15 Claims. (Cl. 170—163)

This invention relates to propellers, and more particularly, to propellers having means for automatically varying the pitch of the propeller blades.

Many variable-pitch propellers of the automatic type use centrifugally responsive counterweights for one purpose or another, primarily because such counterweights are responsive to rotational speed which is the factor whose control is desired. While variable pitch propellers having centrifugally responsive counterweights used heretofore are capable of changing their pitch in response to forces set up within the propeller, due to changes in one or more of various factors, such as air speed, air density, propeller thrust or engine torque, they can do so only in accordance with the constructional characteristics of the propeller. These characteristics depend to a great extent upon the size and position of the counterweights present in each particular case. While these characteristics may suit one, two or three flight conditions they will not satisfy a wide range of conditions. For example, the propeller may be adjusted to maintain proper rotational speed during take-off, climb at high speed at one altitude, and at normal cruising speed, but it would be impossible for this same propeller to provide the optimum rotational speed for long-range flight.

Another flight condition that is difficult to satisfy with the present automatic propeller is maximum climb at high altitudes. Because engine power of most aircraft engines falls off with altitude (except those supercharged with a turbo-driven supercharger), the rotational speed will tend to fall off, which will result in loss of power.

It is an object of the present invention to so improve the automatic variable pitch propeller using centrifugally responsive masses that the aforementioned difficulties are largely overcome. To accomplish this the invention provides a new method, as well as means, which permit varying the characteristics of the propeller during its operation. More specifically, this invention contemplates a method, and means for carrying out the method, which allows the operator to bring about changes in the size, and preferably also in the position, of the centrifugal masses acting upon the propeller blades while the propeller is in operation. If the propeller is to serve as an aircraft propeller the pilot will be able to bring into play centrifugal masses of varying magnitude while the aircraft is in flight.

It is a further object of this invention to provide a variable pitch propeller whose centrifugally responsive masses which influence the pitch are so constructed and placed that the distribution of said masses can be varied while the propeller is in operation.

A further object of the invention resides in the provision of a variable pitch propeller equipped with centrifugally responsive pitch influencing masses and with means for moving desired portions of said masses from a pitch-increasing position to a pitch decreasing position and vice versa.

A still further object of the invention is to provide a variable pitch propeller having two centrifugally responsive masses for each blade, either of said masses being augmentable or reduceable at the expense or benefit of the other mass.

Another object of the invention is to provide a variable pitch propeller which allows the pilot to increase or decrease, at his discretion, by any reasonable amount within certain limits, the rotational speed without having to alter the position of the throttle.

It is a further object of the invention to provide a variable pitch propeller in which the centrifugally responsive mass operatively connected to each blade consists at least in part of liquid, means being provided to vary the distribution of said liquid and thereby the centrifugal moment exerted by it upon the blade.

A still further object of the invention is the provision of a variable pitch propeller having two liquid containers, operatively connected to each blade, which are in such communication with each other than liquid can be transferred from one container to the other.

The invention is further directed to the provision of a variable pitch propeller having a centrifugally responsive solid weight connected to each blade and in addition to such a weight, two liquid containers such as have just been mentioned. In a preferred embodiment one of these containers is directly attached to the solid weight.

The invention further contemplates positioning two centrifugally responsive masses which are coordinated with each blade, and whose distribution is subject to variation during the operation of the propeller in such a manner that one of said two masses is situated farther from the propeller axis than the other mass.

The invention has for a further object a simple device capable of providing for the above-mentioned transfer of mass from one position upon the propeller to another such position during the operation of the propeller. A device that can be applied to any propeller employing centrifugally responsive weights as a means of control.

Other objects and advantages of the invention will appear as the description proceeds, reference being made to the accompanying drawings, in which—

Fig. 3 shows a modified form of a detail shown in Fig. 2; and

Fig. 4 illustrates diagrammatically certain principles of the invention, one of the propeller blades and a counterweight attached to the ferrule thereof being indicated in an end view.

Figure 1:
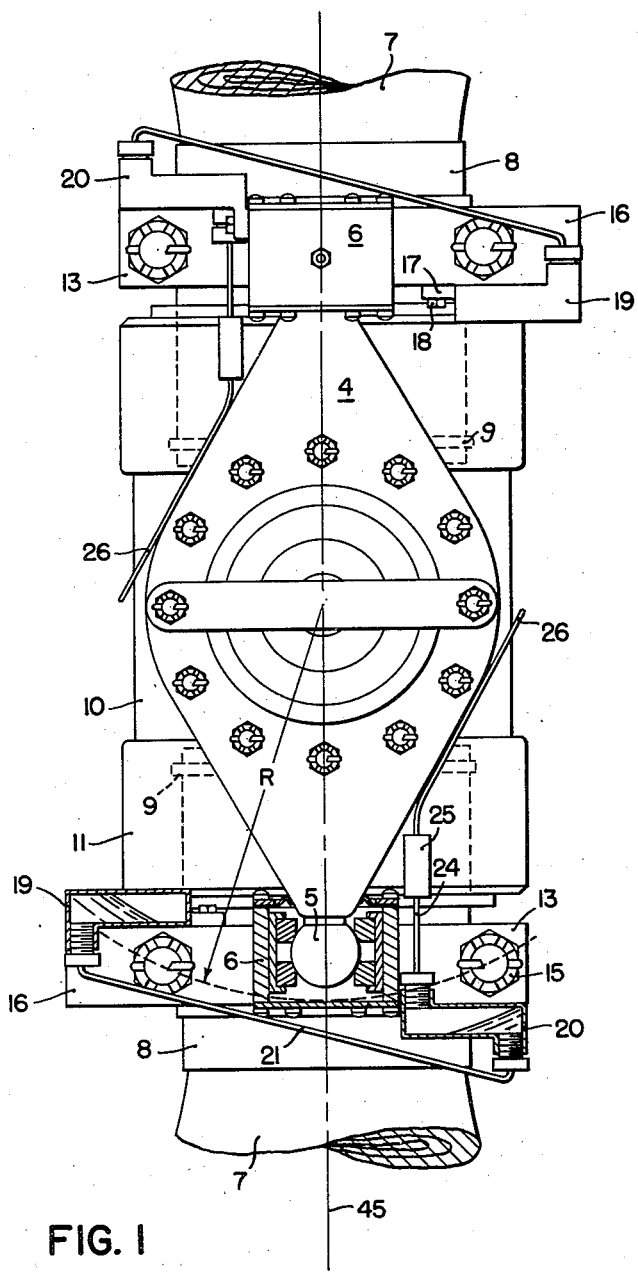
Fig. 1 is a front view, partly in section, of a variable pitch propeller embodying the invention.
Figure 2:
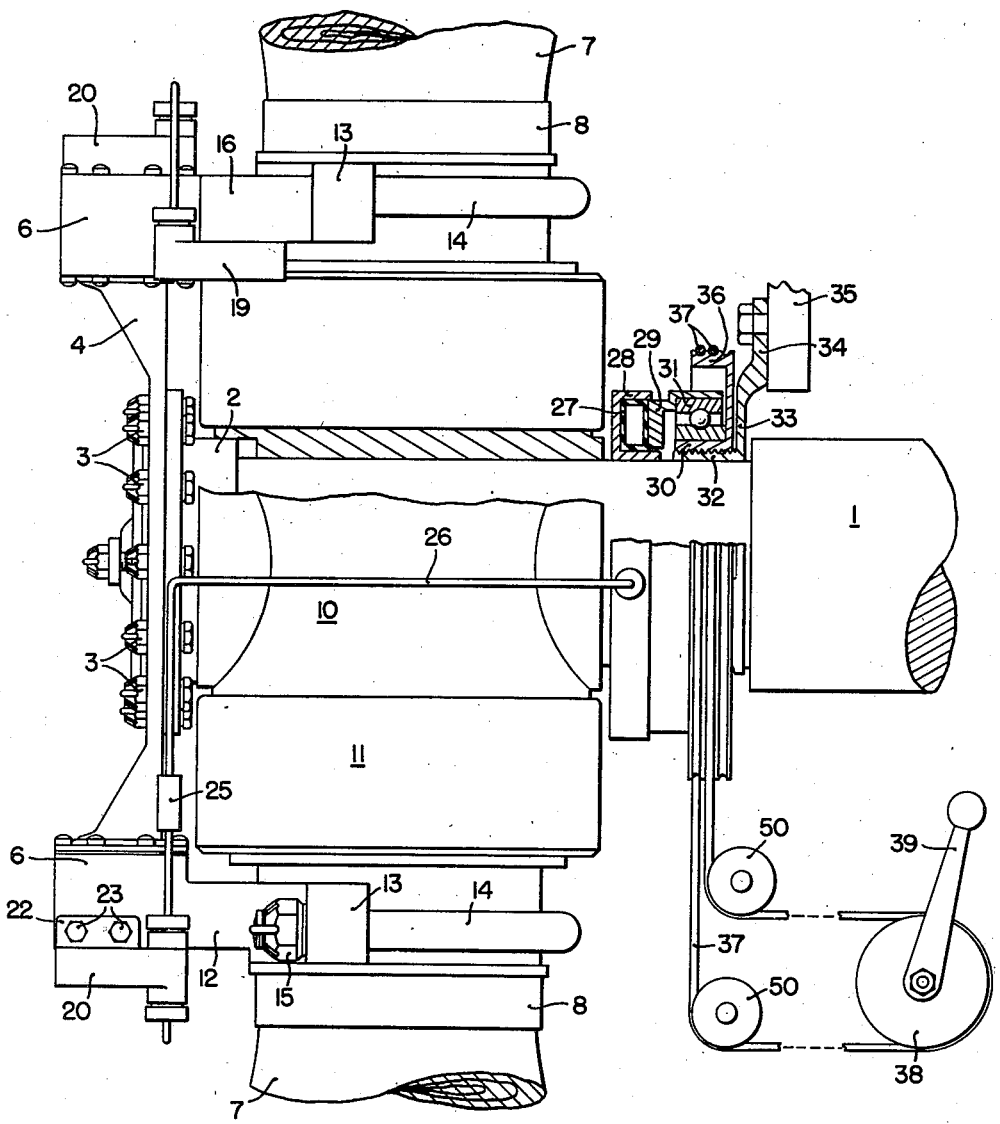
Fig. 2 is a side elevation, partly in section, of the propeller shown in Fig. 1.

While the invention can be applied to any variable-pitch propeller the pitch of whose blades is determined in part by the position and the size of the attached counterweights, I have illustrated the invention in Figs. 1 and 2 as applied to a type of aircraft propeller which is shown in U. S. Patent No. 1,829,443, granted to R. R. Gobereau et al.

Referring first to Fig. 1 and Fig. 2, 1 denotes a propeller shaft having attached to its forward end a flange 2. Secured to the flange 2 by means of screws 3 is a cross arm 4 whose two ends 5 project out of the plane of the arm 4 and take universal bearing in two sockets 6. Each socket 6 is connected in a manner to be presently described with one of the two propeller blades 7, each of which is fastened in a sleeve 8. The sleeves 8 are rotatable, supported in the ends of a hub 10, generally cylindrical in shape and extending at right angles to the hub on which it can turn and on which it has limited axial play. Each sleeve has a flange 9 near its inner end. This flange transmits the large radial pull created by the centrifugal forces acting on the blade 7 to anti-friction bearings (not shown) that are contained in the ends of the hub 10. A cap 11 that may be secured on to the end of the hub holds the anti-friction bearings in place. Thus each blade is supported in a manner permitting it to turn about its axis.

Each of the sockets 6, in which the projecting ends 5 of the cross arm 4 are supported, is carried by a bracket 12 attached to one of the propeller sleeves 8, so that part of the engine torque is transmitted through the cross arm 4 and the brackets 12 to the sleeve 8 of the blade. Each bracket 12 has two lugs 13 through which a U-bolt 14 passes. Both ends of the U-bolts 14 are threaded so that nuts 15 may be placed upon these ends. While one end of each U-bolt 14 projects beyond the one lug 13 only far enough to allow threading on the nut 15, the other end of that bolt 14 extends beyond the other lug 13 a distance great enough to accommodate between the lug 13 and the nut 15 a solid centrifugal weight 16. When the nuts 15 are drawn up tightly the brackets 12 and the weights 16 are clamped securely to their respective propeller blade sleeves 8.

Figure 4 shows diagrammatically an end view of one blade 7. This blade has limited angular movement about the axis 45 of the sleeve. The hub, carrying the sleeve and the blade, revolves about B—B, the axis of the propeller shaft extending forward from motor 46.

The blade 7, revolving about axis B—B is moving to the left in direction C in the plane A—A. The variable pitch angle the blade 7 makes with the plane of rotation A—A is $\phi$. M is a mass secured to the sleeve 8 along radial line 47. The blade is subject to two opposed movements, each tending to turn the blade about sleeve axis 45. One moment is created by the driving torque of the engine acting upon socket 6 and tends to reduce $\phi$. The other force, centrifugal force on mass M, creates a component $m_1$ whose moment tends to increase the pitch $\phi$. For any particular operating condition these moments will be in equilibrium for a particular value of $\phi$. Other factors being equal, the angle $\phi$ at which equilibrium will exist depends upon the amount of the mass M, $\phi$ being smaller for a smaller mass and larger for a larger mass.

This invention provides means whereby a part of the mass attached to the sleeve of the propeller blade can be shifted during the operation of the propeller to a new position on radial line 48 angularly displaced about the propeller axis, and thereby the twisting moment may be changed at the discretion of the operator. For example, in the case of an airplane propeller, the pilot is in a position to change the characteristics of the propeller during flight as conditions not sufficiently compensated by the automatic control may require. Heretofore a change in characteristics of the propeller to be accomplished by changing the counterweights could be carried out only while the plane was on the ground and the propeller at rest.

The new position 48 to which part of the mass M may be shifted is to be chosen so that the mass transferred to that new position will create a centrifugal component $m_2$ whose moment affects the pitch of the blade in a manner opposite to the moment created by component $m_1$ of the mass M in position 47. In Fig. 4 the position 48 is shown to be displaced from the position 47 by an angle of about 90°, but this angular displacement may be substantially smaller or greater than 90°. It may be as small as 40° or as great as 130°. While the position 48 is shown to be displaced from position 47 in the clockwise direction, the displacement could be in the counterclockwise direction, always providing that the two positions selected are related to each other in such a manner that under centrifugal action a mass placed in position 48 will have upon the pitch an influence opposite to that which it will have if placed in position 47.

Position 48 is preferably so chosen that a mass at that point will create a moment opposite to that of a mass located at 47. This is done to secure the maximum effect for the displacement of a given mass.

But it is not essential that the moments created by a mass at 47 and 48 be in opposite directions.

As long as positions 47 and 48 are so related that moving a portion of the mass located at one position to the other position will change the size of the moment exerted by that mass, though not its direction, the pilot will be able to change the characteristics of the propeller during flight.

Figs. 1 and 2 show, by way of illustration, physical means for carrying out the shift of a centrifugally responsive mass between two positions corresponding to the positions 47 and 48 in the diagram of Fig. 4. To the solid weight 16 which is provided for each blade 7 and whose position may correspond approximately to position 47 a liquid container 19 is attached by means of a bracket 17 and bolts 18. A second liquid container 20 is supported on sleeve 8 angularly displaced about axis 45 from the container 19 by a suitable angular amount so that its angular position may correspond to the position 48 of Fig. 4. The two containers 19, 20 are connected by a pipe 21 allowing liquid to flow or to be forced from one container to the other. The container 20 is attached by means of a flange 22 and bolts 23 to the bracket 12 and its distance from the axis of rotation of the propeller is somewhat greater than the corresponding distance of the container 19. This is readily noted in Fig. 1 by the position of the two containers in relation to an arc swung with radius R about the shaft axis. A pipe 24 leads from the container 20 through a flexible connection 25, such as a rubber tube, to a pipe 26. The pipe 26 extends along the side of the hub 10 to the rear end of the latter where it establishes a connection with the interior of a fluid receptacle which is supported by the shaft 1 and revolves therewith.

In the embodiment shown in Fig. 1 the fluid receptacle is in the form of a closed tube 27 made of rubber or other resilient material and placed within an annular cylinder 28. In this case there is a common receptacle 27 for all the blades of the propeller, that is to say, as many pipes 26 open into this receptacle 27 as there are blades on the propeller. A piston 29 slidable in the cylinder 28 is adapted to vary the space available for the fluid in the receptacle 27. This is brought about in this example shown by compressing the compressible receptacle 27 itself more or less. The piston 29 revolving with the shaft can be moved axially by a jack nut 30 which is not revolving but which transmits motion to the piston in the axial direction through a thrust bearing 31. The jack nut 30 is threaded onto a stationary jack screw 32 which forms a part of the piece 33 having a flange 34 that is bolted to the crank case 35 of the engine. The jack nut 30 is integral with a drum 36 around which is wrapped a cable 37. This cable extends over sheaves 50 to the pilot's compartment. There the cable 37 is wound around a drum 38 which can be turned by any means such as a hand crank 39.

The containers 19 and 20 are partly filled with a liquid. The movement of this liquid mass between containers 19 and 20 which, as shown in Fig. 4, are in different angular positions as regards the blade sleeve axis 45, provides the means for changing the characteristics of the propeller while in flight.

This liquid mass may be moved in any manner but in the example given the movement is caused by the pressure of a much lighter fluid on the surface of the liquid contained in container 20 driving the liquid back into container 19. To secure maximum effectiveness of the liquid mass, mercury is preferably used to partly fill containers 19 and 20 and for the light fluid whose sole function is to move the liquid mass in the containers light oil may be used. Because the centrifugal force greatly increases the effective specific gravity of the heavy liquid it will flow from container 19 to 20 even if the void left by the receding liquid leaves a vacuum.

Since the container 20 of each blade is further removed from the propeller axis than the container 19 of the same blade, centrifugal force tends to force the liquid mass in the container 19 to flow through pipe 21 into the container 20 unless pressure is applied to container 20 to force the liquid mass back. By compressing the fluid receptacle 27, fluid contained therein is forced through the pipes 26, 25 and 24 into the container 20, displacing all or any desired portion of the heavy liquid present in this container 20. This displaced quantity of the liquid mass will be forced from the container 20 into the container 19 against the hydraulic head produced by the action of the centrifugal force. If the pressure upon the receptacle 27 is released, centrifugal action will drive back liquid from container 19 into container 20 and the lighter fluid contained at the time in the container 20 will be forced back into the receptacle 27. Thus the operator can change the distribution of the centrifugally responsive masses between wide limits during flight, transferring as much of the heavy liquid as he desires from the container 19 carried by the weight 16 into the container 20, or returning this liquid from the container 20 to the container 19 when he desires to restore the original conditions.

When it is desired to reduce the rotational speed of the engine, which requires that the centrifugally responsive mass which tends to increase the pitch be augmented and the centrifugally responsive mass which tends to reduce the pitch be reduced, the hand crank 39 is actuated in such direction that the piston 29 squeezes the receptacle 27 in the cylinder 28. Fluid contained in the receptacle 27, such as oil, is forced out through the connecting pipe line into the container 20. The heavy liquid within container 20, such as mercury, is displaced by the less dense oil and forced into container 19. Since the container 19 is at a smaller radius than the container 20, it will require force to move the mercury in this direction. Transferring mercury from container 20 to container 19 will have two effects: It will reduce the centrifugal twisting moment tending to decrease the pitch and increase the centrifugal moment tending to increase the pitch. Therefore, the pitch will be increased to a higher value and the engine will rotate at a reduced rate.

In order to reverse this operation, viz., increase the rotational speed, crank 39 may be turned in the opposite direction. This will cause the piston 29 to move out of the cylinder 28, relieving thereby the compressible receptacle 27 from pressure. Thus the centrifugal force can act freely on the mercury held in container 19 so that this mercury will flow into the container 20 which is farther from the propeller axis than container 19. This will return the oil previously forced into the container 20 to the receptacle 27.

A modified form for applying hydraulic pressure upon the interior of the container 20 which is farther from the propeller axis is shown in Fig. 3. Instead of the annular cylinder and closed tube illustrated in Fig. 1 the shaft 1 carries a flanged ring 40 supporting a number of bellows 41, one for each blade. Each bellow connects with one of the pipes 26. The piston 29, instead of compressing a single tube, such as 27 in Fig. 1, compresses all of the bellows 41 uniformly and discharges the oil contained in the bellows through the pipes 26 into the containers 20 in the same manner as has already been described.

I desire it to be understood that the invention is not limited to the particular constructional embodiments shown and described hereinbefore, but that these embodiments have been given as illustrative examples only, since it will be obvious that various changes and modifications may be made without departing from the spirit of the invention or the scope of the appended claims.

What I claim is:

1. In a propeller having a shaft, a hub, and blades turnably mounted in sockets in the hub, a centrifugally responsive weight attached to each blade for producing a movement tending to turn said blade in its socket, a liquid container attached to said weight, a second liquid container attached to each blade at a smaller distance from the axis of rotation of the propeller than said first container, a pipe connecting said containers allowing liquid to flow from said first container to said second container in response to a fluid pressure created in said first container and to return to said second container under the action of centrifugal force in the absence of such fluid pressure, means for creating said fluid pressure comprising a receptacle mounted on the propeller shaft so as to participate in the rotation thereof, a member slidable parallel to the propeller axis, a bearing attached to said member and having a rotating element and a normally non-rotating element, said bearing being adapted to transmit axial movement from said normally non-rotating element to said rotating element, a jack-nut in engagement with a jack-screw, one of said two jack parts being adapted to move the normally non-rotating element of said bearing in an axial direction whereas the other jack part is fixedly mounted, said movable jack part being secured to a rotatable drum, a lever operable by the operator, and movement transmitting means between said lever and said drum.

2. A variable-pitch propeller comprising a hub having arms; blades free to pivot within set limits on the arms; a centrifugally responsive solid weight supported by each blade, two containers attached to said weight, one of said containers spaced further from the plane of rotation of the propeller and at a different distance from the propeller axis than the other container, a conduit connecting the two containers, and means operable while the propeller is in operation adapted to transfer liquid from the container furthest from the propeller axis to the other container.

3. A variable-pitch propeller comprising a hub having arms; blades free to pivot within set limits on the arms, a centrifugally responsive solid weight supported by each blade, two containers attached to said weight, one of said containers spaced further from the plane of rotation of the propeller and at a different distance from the propeller axis than the other container and in a different one of the four quadrants defined by the intersection of the plane of rotation and a perpendicular plane passing through the blade axis of rotation, a conduit connecting the two containers, and means operable while the propeller is in operation adapted to transfer liquid from the container furthest from the propeller axis to the other container.

4. A variable-pitch propeller comprising a hub having arms; blades free to pivot within set limits on the arms; a centrifugally responsive solid weight supported by each blade, two containers attached to said weight, one of said containers spaced further from the plane of rotation of the propeller and at a different distance from the propeller axis than the other container, a conduit connecting the two containers, and means operable while the propeller is in operation adapted to drive liquid from the container furthest from the propeller axis to the other container against centrifugal force which force will return the liquid when said means permit.

5. A variable-pitch propeller comprising a hub having arms; blades free to pivot within set limits on the arms; a centrifugally responsive solid weight supported by each blade, a container attached to said weight, a closed container supported by each blade spaced further from the propeller axis and at a different distance from the plane of rotation of the propeller than the other container, a conduit connecting said containers, hydraulic pressure means controllable during operation of the propeller adapted to exert pressure upon the interior of the closed container so as to force liquid from this container through said conduit into the other container against the action of centrifugal force, which force will cause said liquid to flow in the opposite direction upon relieving the hydraulic pressure on said closed container.

6. A variable-pitch propeller comprising a hub having arms; blades free to pivot within set limits on the arms; a centrifugally responsive solid weight supported by each blade, a container attached to said weight, a closed container attached to each blade spaced further with respect to the other container from the propeller axis and in an adjacent quadrant formed by the plane of rotation and a plane intersecting at right angles thereto and passing through the propeller rotational axis and blade axis, a conduit connecting said containers, a heavy liquid in said closed container, a receptacle in communication with said closed container, a fluid of lower density in the receptacle than said liquid that fills said closed container, means actuable during operation of the propeller adapted to reduce the space available in said receptacle for said fluid thereby forcing a desired amount of said low-density fluid out of said receptacle and into the container farther from the propeller axis.

7. A variable-pitch propeller comprising a hub having arms; blades free to pivot within set limits on the arms; a centrifugally responsive solid weight supported by each blade, a container attached to said weight, a closed container attached to each blade spaced further with respect to the other container from the propeller axis and in an adjacent quadrant formed by the plane of rotation and a plane intersecting at right angles thereto and passing through the propeller rotational axis and blade axis, a conduit connecting said containers, a heavy liquid in said closed container, a compressible receptacle in communication with said closed container, a fluid of lower density in the receptacle than said liquid that fills said closed container, means actuable during operation of the propeller for compressing said receptacle and thereby forcing a desired amount of said low-density fluid out of said receptacle and into the container which is farther from the propeller axis.

8. A variable-pitch propeller comprising a hub having arms; blades free to pivot within set limits on the arms; a centrifugally responsive solid weight supported by each blade, a container attached to said weight, a closed container attached to each blade spaced further with respect to the other container from the propeller axis and in an adjacent quadrant formed by the plane of rotation and a plane intersecting at right angles thereto and passing through the propeller rotational axis and blade axis, a conduit connecting said containers, a heavy liquid in said closed container, a compressible receptacle in communication with said closed container, a fluid of lower density in the receptacle than said liquid filling said closed container, said receptacle being mounted so as to participate in the rotation of the propeller, means comprising a member slidable along the propeller axis adapted to compress said compressible receptacle.

9. A variable-pitch propeller comprising a hub having arms; blades free to pivot within set limits on the arms; a centrifugally responsive solid weight supported by each blade, a container attached to said weight, a closed container attached to each blade spaced further with respect to the other container from the propeller axis and in an adjacent quadrant formed by the plane of rotation and a plane intersecting at right angles thereto and passing through the propeller rotational axis and blade axis, a conduit connecting said containers, a heavy liquid in said closed container, a compressible receptacle in communication with said closed container, a fluid of lower density in said receptacle than said liquid filling said closed container, said receptacle being mounted so as to participate in the rotation of the propeller, means comprising a member slidable along the propeller axis adapted to compress said compressible receptacle, a cylinder surrounding said receptacle, a piston slidable in said cylinder adapted to compress said receptable and thereby force a desired amount of said fluid out of said receptacle and into the container which is farther from the propeller axis.

10. A variable-pitch propeller comprising a hub having arms; blades free to pivot within set limits on the arms, a centrifugally responsive solid weight supported by each blade, a container attached to said weight, a closed container also attached to the weight but spaced further from the propeller axis and at a different distance from the plane of rotation of the propeller than the other container and in a different one of the four quadrants defined by the intersection of the plane of rotation and a perpendicular plane passing through the blade axis of rotation, a conduit connecting said containers, a heavy liquid in said closed container, a compressible receptacle in communication with said closed container, a fluid of lower density in said receptacle than said liquid filling said closed container, a cylinder surrounding said receptacle, a piston slidable in said cylinder adapted to compress said receptacle and thereby force a desired amount of said fluid out of said receptacle and into the container which is farther from the propeller axis, said cylinder and said compressible receptacle being mounted on the propeller shaft so as to participate in the rotation thereof.

11. A variable pitch propeller having a hub, radially extending sockets in the hub, blades supported in the sockets, each blade free to turn upon the axis of its socket in response to moments set up by forces including aerodynamic and centrifugal forces, a liquid container attached to the blade at a point where it creates a pitch altering moment during the rotation of the propeller, a second liquid container attached to the blade at a point where it creates the reverse pitch altering moment, liquid partly filling said containers, a conduit connecting said containers, means operable during the rotation of the propeller to shift at will liquid from one container to the other through said conduit thereby creating a moment which causes the blade to assume a new pitch at which the various moments about the axis will again cancel each other out.

12. A variable pitch propeller having a hub, radially extending sockets in the hub, blades supported in the sockets, each blade free to turn upon the axis of its socket in response to moments set up by forces including aerodynamic and centrifugal, a mass divided into primary, connecting, and secondary portions supported by and movable with each blade, the primary mass being so placed on the blade as to create a moment of one sign while the secondary mass is so placed as to create a moment of reverse sign, a conduit extending along the propeller shaft to the primary mass on each blade, a fluid adapted to pass through said conduit to displace a portion of the primary mass through the connecting mass to the secondary mass, a collapsible container supplying fluid to said conduit, means to collapse said container while the shaft is in operation.

13. A variable pitch propeller having a hub, radially extending sockets in the hub, blades supported in the sockets, each blade free to turn upon the axis of its socket in response to moments set up by forces including aerodynamic and centrifugal, a mass divided into primary, connecting and secondary portions supported by and movable with each blade, the primary and secondary masses being so placed on the blade that unit masses in each location create a different moment, a conduit extending along the propeller shaft to the primary mass on each blade, a fluid adapted to pass through said conduit to displace a portion of the primary mass through the connecting mass to the secondary mass, a collapsible container supplying fluid to said conduit, means to collapse said container while the shaft is in operation.

14. A variable pitch propeller having a hub, radially extending sockets in the hub, blades supported in the sockets, each blade free to turn upon the axis of its socket in response to moments set up by forces including aerodynamic and centrifugal, a mass divided into primary, connecting, and secondary portions supported by and movable with each blade, the primary mass being so placed on the blade as to create a moment of one sign while the secondary mass located closer to the hub than the primary mass is so placed as to create a moment of reverse sign, a conduit extending along the propeller shaft to the primary mass on each blade, a fluid adapted to pass through said conduit to displace against the centrifugal force of rotation a portion of the primary mass through the connecting mass to the secondary mass, a collapsible container supplying fluid to said conduit, and means to collapse said container opposing the hydraulic head created by the net centrifugal force acting on said two masses while the shaft is in operation to change the propeller characteristics.

15. A variable pitch propeller having a hub, radially extending sockets in the hub, blades supported in the sockets, each blade free to turn upon the axis of its socket in response to moments set up by forces including aerodynamic and centrifugal, a mass divided into primary, connecting, and secondary portions supported by and movable with each blade, the primary and secondary masses being so placed on the blade that unit masses in each location create a different moment and the secondary mass located closer to the hub than the primary mass, a conduit extending along the propeller shaft to the primary mass on each blade, a fluid adapted to pass through said conduit to displace a portion of the primary mass through the connecting mass to the secondary mass against the centrifugal force of rotation, a collapsible container supplying fluid to said conduit, means to collapse said container while the shaft is in operation to change the propeller characteristics, and when it is desired change the propeller characteristics back to their original type allowing the centrifugal force of rotation acting on the secondary mass to return part of the secondary mass to the primary mass pushing the fluid back to said collapsible container.

DAVID BIERMANN.

REFERENCES CITED

The following references are of record in the file of this patent:

UNITED STATES PATENTS

| Number | Name | Date |
|---|---|---|
| 1,556,012 | Flettner | Oct. 6, 1925 |
| 1,982,170 | Lansing | Nov. 27, 1934 |
| 2,219,303 | Fraser | Oct. 29, 1940 |
| 1,829,443 | Gobereau et al. | Oct. 27, 1931 |
| 1,813,852 | Isacco | July 7, 1931 |
| 1,897,092 | Weir | Feb. 14, 1933 |
| 2,106,557 | Putnam | Jan. 25, 1938 |
| 2,275,053 | Reissner | Mar. 3, 1942 |
| 2,344,266 | Reissner | Mar. 14, 1944 |
| 2,364,131 | Daniels | Dec. 5, 1944 |
| 2,085,769 | Scott | July 6, 1937 |
| 2,032,254 | Caldwell | Feb. 25, 1936 |
| 2,307,101 | Blanchard et al. | Jan. 5, 1943 |

FOREIGN PATENTS

| Number | Country | Date |
|---|---|---|
| 124,935 | Great Britain | Apr. 10, 1919 |
| 488,477 | Great Britain | July 7, 1938 |